(12) United States Patent
Chen et al.

(10) Patent No.: US 9,507,397 B2
(45) Date of Patent: Nov. 29, 2016

(54) POWER SUPPLYING CIRCUIT, POWER SUPPLYING SYSTEM AND POWER SUPPLYING METHOD

(71) Applicant: WISTRON CORP., New Taipei (TW)

(72) Inventors: Chien-Liang Chen, New Taipei (TW); Chien-Fu Liao, New Taipei (TW)

(73) Assignee: WISTRON CORP., New Taipei (TW)

( * ) Notice: Subject to any disclaimer, the term of this patent is extended or adjusted under 35 U.S.C. 154(b) by 280 days.

(21) Appl. No.: 14/244,975

(22) Filed: Apr. 4, 2014

(65) Prior Publication Data

US 2015/0134980 A1  May 14, 2015

(30) Foreign Application Priority Data

Nov. 11, 2013 (TW) .............................. 102140875 A

(51) Int. Cl.
*G06F 1/26* (2006.01)
*G06F 1/32* (2006.01)

(52) U.S. Cl.
CPC ............. *G06F 1/263* (2013.01); *G06F 1/3206* (2013.01)

(58) Field of Classification Search
CPC .............................. G06F 1/263; G06F 1/3206
USPC ........................................................ 713/300
See application file for complete search history.

(56) References Cited

U.S. PATENT DOCUMENTS

| 7,397,151 B2 | 7/2008 | Ishino | |
| 7,441,137 B1* | 10/2008 | Mimberg | G05F 1/462 |
| | | | 713/300 |
| 8,649,128 B2 | 2/2014 | Wang et al. | |
| 2006/0277420 A1 | 12/2006 | Nguyen | |
| 2009/0059455 A1* | 3/2009 | Rosenquist | H02J 9/061 |
| | | | 361/90 |
| 2009/0290387 A1* | 11/2009 | Wheeler | H02M 3/33507 |
| | | | 363/21.01 |

FOREIGN PATENT DOCUMENTS

| CN | 101185047 A | 5/2008 |
| TW | 200525865 A | 8/2005 |
| TW | 201126855 A1 | 8/2011 |

OTHER PUBLICATIONS

Taiwan Patent Office, Office action issued on Apr. 13, 2015.

\* cited by examiner

*Primary Examiner* — Mark Connolly
(74) *Attorney, Agent, or Firm* — Li & Cai Intellectual Property (USA) Office

(57) ABSTRACT

A power supplying circuit adapted for receiving an output from a power adapter and supplying power to a battery unit and a system load is provided. The power supplying circuit includes a charger unit, a switching unit, and a voltage regulating unit. The charger unit receives a first supplying voltage from the power adapter through a power terminal and charges the battery unit. The switching unit is coupled to the power terminal and the charger unit. The switch unit is configured for receiving the first supplying voltage and a second supplying voltage from the charger unit. The voltage regulating unit is coupled to the switching unit and configured for powering the system load. The switching unit supplies the first supplying voltage to the voltage regulating unit under heavy load condition. The switching unit supplies the second supplying voltage to the voltage regulating unit under light load condition.

16 Claims, 10 Drawing Sheets

POWER SUPPLYING CIRCUIT, POWER SUPPLYING SYSTEM AND POWER SUPPLYING METHOD

BACKGROUND OF THE DISCLOSURE

1. Field of the Disclosure

The present disclosure relates to a power supplying circuit, a power supplying system, and a power supplying method, more particular, to a power supplying circuit, a power supplying system and a power supplying method for a portable computer apparatus.

2. Description of Related Art

As technology advances, portable computer apparatuses equipped with rechargeable battery such as laptop and tablet are convenient to carry and are widely used in today's society, A portable computer apparatus usually receives an external power for powering operations thereof and charging the rechargeable battery thereof from either a power adapter which converts AC to DC, or a conventional power equipment. The power system of the portable computer apparatus typically adopts either the conventional power supplying structure or the narrow voltage direct current (NVDC) power supplying structure proposed by Intel for powering internal system components in the portable computer apparatus.

Under the conventional power supplying structure, the supplying voltage outputted by the power adapter is directly supplied to a voltage regulator of the portable computer apparatus and converted to the operating voltage required for driving the system load of the portable computer apparatus. Whereas, under the narrow voltage direct current (NVDC) power supplying structure, the supplying voltage outputted by the power adapter is first converted to the charging voltage by the built-in charger and then supplies to the voltage regulator and the rechargeable battery. Since adopting the NVDC power supplying structure, the charging voltage can be directly converted into the operating voltage for driving the system load and charging rechargeable battery, thus, when the system load operates in a light load condition, the NVDC power supplying structure has relative high the power conversion efficiency in comparison to the conventional power supplying structure. Recently, most of the portable computer apparatuses adopts the NVDC power supplying structure instead of the conventional power supplying structure as the power supplying structure for the portable computer apparatuses.

However, because to be able to support the operation of each system component during the operation of the portable computer apparatus, the supplying voltage supplied by the NVDC power supplying structure needs to be boosted by an additional boost circuit. Hence, not only the power conversion efficiency of the NVDC power supplying structure under a heavy load condition is lower than the conventional supplying structure, but also increase the loading on the charging battery thereby reduce the life of the rechargeable battery.

SUMMARY

In the light of this, the present disclosure provides a power supplying circuit, a power supplying system, and a power supplying method, which can selectively use the conventional power supplying structure or the narrow voltage direct current power supplying structure to supply operational power according to the power consumption of a portable computer apparatus. Hence not only the voltage conversion efficiency during the system operation of the portable computer apparatus can be improved, the life of the rechargeable battery can also be increased.

An exemplary embodiment of the present disclosure provides a power supplying circuit, which is adapted for receiving an output from a power adapter and supplying power to a battery unit and a system load. The power supplying circuit includes a charger unit, a switching unit, and a voltage regulating unit. The charger unit receives a first supplying voltage from the power adapter through a power terminal and charges the battery unit. The switching unit is coupled to the power terminal and an output terminal of the charger unit. The switch unit is configured for receiving the first supplying voltage and a second supplying voltage from the charger unit. The voltage regulating unit is coupled to the switching unit. The voltage regulating unit is configured for powering the system load. The switching unit supplies the first supplying voltage to the voltage regulating unit under a heavy load condition and supplies the second supplying voltage to the voltage regulating unit under a light load condition. The power consumption of the system load under the heavy load condition is greater than the power consumption of the system load under the light load condition.

An exemplary embodiment of the present disclosure provides a power supplying system which is adapted for a portable computer apparatus. The power supplying system includes a power adapter and the aforementioned power supplying circuit. The power adapter is coupled to an AC power source. The power adapter is configured for rectifying to an AC voltage of the AC power source and generating a first supplying voltage. The power supplying circuit receives an output from the power adapter, and supplies power to a battery unit and a system load. The power adapter and the system load can be disposed on a mainboard.

In an exemplary embodiment of the present disclosure, the switching unit further includes a power switching circuit and a control unit. The power switching circuit is coupled to the power terminal, the output terminal of the charger unit, and the voltage regulating unit. The power switching circuit is configured for establishing a first power supplying path between the power terminal and the voltage regulating unit or establishing a second power supplying path between the charger unit and the voltage regulating unit. The control unit is coupled to the power switching circuit. The control unit is configured to detect the power consumption of the system load and control the power switching unit to selectively conduct the first power supplying path or the second power supplying path to supply the first voltage supplying voltage or the second supplying voltage to the voltage regulating unit.

An exemplary embodiment of the present disclosure provides a power supplying method which is adapted for the power supplying circuit above. The power supplying method includes the following steps. The operating state of a system load is first detected. A power source for powering the system load is subsequently determined based on the detection result. When the system load operates under a heavy load condition, the switching unit operatively supplies the first supplying voltage to the voltage regulating unit to power the system load. When the system load operates under a light load condition, the switching unit operatively supplies the second supplying voltage to the voltage regulating unit to power the system load. The power consumption of the system load under the heavy load condition is greater than the power consumption of the system load under the light load condition.

In summary, exemplary embodiments of the present disclosure provides a power supplying circuit, a power supplying system, and a power supplying method. The power supplying circuit, the power supplying system, and the power supplying method are configured to actively detect the system power consumption while the portable computer apparatus is in operation, and determine a power source for the system operation of the portable computer apparatus. When the system power consumption of the portable computer apparatus is relatively large, the power supplying circuit automatically selects the conventional power supplying method for powering the system; when the system power consumption of the portable computer apparatus is relatively small, the power supplying circuit automatically selects the narrow voltage direct current power supplying method for powering the system. Accordingly, the portable computer apparatus effectively enhances the voltage conversion efficiency of the system operation by having the power supplying circuit installed therein. At the same time the life of the charging battery can be increased, thereby enhances the overall operation efficiency of the portable computer apparatus.

In order to further the understanding regarding the present disclosure, the following embodiments are provided along with illustrations to facilitate the disclosure of the present disclosure.

DETAILED DESCRIPTION OF THE PREFERRED EMBODIMENTS

Figure 1:
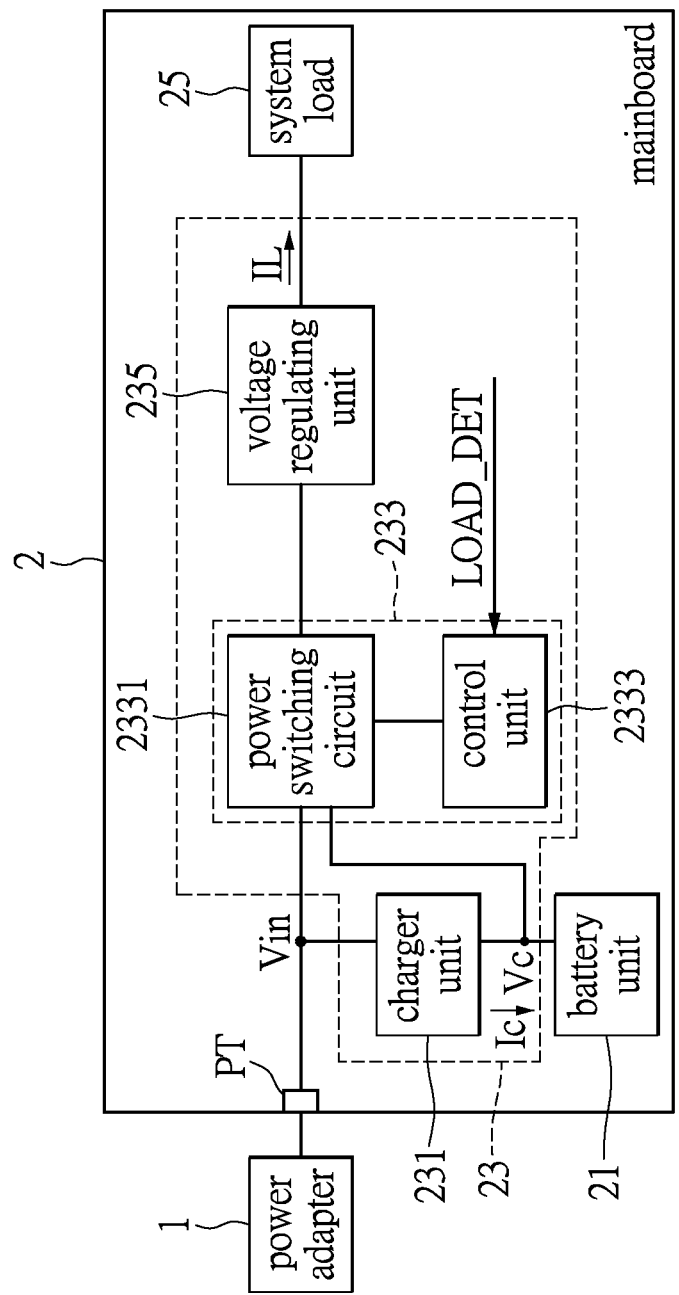
FIG. 1 is a block diagram of a power supplying system provided according to an exemplary embodiment of the present disclosure.

Please refer to FIG. 1, which shows a block diagram of a power supplying system provided according to an exemplary embodiment of the present disclosure. The power supplying system can be adapted for a portable computer apparatus (not shown) such as a laptop or a tablet, and the instant embodiment is not limited thereto.

The power supplying system includes a power adapter 1, a battery unit 21, a power supplying circuit 23, and a system load 25, wherein the battery unit 21, the power supplying circuit 23, and the system load 25 are disposed on a mainboard 2, respectively. The mainboard 2 is installed in the portable computer apparatus. The power adapter 1 is coupled to the mainboard 2. The power supplying circuit 23 is coupled between the power adapter 1 and the battery unit 21 and between the power adapter 1 and the system load 25.

The power adapter 1 is configured for rectifying an AC voltage received from an AC power source and generating a first supplying voltage Vin to power each of the electrical components disposed on the mainboard 2, wherein the first supplying voltage Vin is a DC voltage. The power adapter 1 can be configured to electrically connect the power terminal PT of the portable computer apparatus through the power line (not shown) and output the first supplying voltage Vin to the mainboard 2 through the power terminal PT.

The battery unit 21 is built-in in the portable computer apparatus. When the portable computer apparatus does not connect to the power adapter 1 (e.g., the power adapter 1 is not present), the battery unit 21 can supply power to the system load 25 through the power supplying circuit 23 to drive the system load 25.

The battery unit 21 can be a single rechargeable battery, such as a Lithium-Ion battery, a Ni—Cd battery, a Ni-MH battery, a rechargeable battery pack formed by multiple rechargeable batteries. The exact type of the battery unit 21 is specifically designed according to the exact type and structure of the portable computer apparatus, and the present disclosure is not limited thereto.

In the instant embodiment, the battery unit 21 is integrated and arranged on the mainboard 2. However, in practice the battery unit 21 can be arranged in other space allocated in the portable computer apparatus, for example, a battery compartment which is arranged to be proximate to the mainboard 2 and configured for placing the battery unit 21 therein.

The power supplying circuit 23 is configured to receive an output from the power adapter 1 and supply power to the battery unit 21 and the system load 25. The power supplying circuit 23 is operable to actively configure a power source for powering the system load 25 according to the operation of the system load 25.

More specifically, the power supplying circuit 23 can actively select the output of the power adapter 1 (i.e., the first supplying voltage Vin) or an input of the battery unit 21 (i.e., a second supplying voltage Vc) as the power source for the system load 25. In other word, the power supplying circuit 23 can automatically select to use the NVDC power supplying or the conventional power supplying to supply power to the system load 25 according to the power consumption of the system load 25.

In the instant embodiment, the system load 25 can represent all the power consuming components (e.g., equivalent resistive loads) disposed on the mainboard 2 which is built-in in the portable computer apparatus. The system load 25 can include but not limited to the central processing unit (CPU) (not shown in FIG. 1), the system operation module (not shown), and the peripheral device (not shown). Incidentally, the practical structure and the implementation of the system load 25 may vary depend upon the exact type and structure of the portable computer apparatus. Moreover, since the structure of the system load 25 is known art to those skilled in the art and is not the main emphasis of the present disclosure, and further details regarding the system load 25 are hereby omitted.

Furthermore, the power supplying circuit 23 includes a charger unit 231, a switching unit 233, and a voltage regulating unit 235. The charger unit 231 is coupled between the power terminal PT and the battery unit 21. The switching unit 233 is coupled to the power terminal PT and an output terminal of the charger unit 231. The voltage regulating unit 235 is coupled between the switching unit 233 and the system load 25.

The charger unit 231 is configured to receive the first supplying voltage Vin form the power adapter 1 through the power terminal PT. The charger unit 231 operatively generates a second supplying voltage Vc to charge the battery unit 21 according to the first supplying voltage Vin and the power required for charging the battery unit 21 required. In the instant embodiment, the voltage level of the second supplying voltage Vc is less than the voltage level of the first supplying voltage Vin.

In practice, the first supplying voltage Vin generated by the power adapter 1 can be 19 Volt (V), and the second supplying voltage Vc outputted by the charger unit 231 can be 7.4 V.

In addition, the charger unit 231 can perform a voltage conversion operation (e.g., buck conversion) to the first supplying voltage Vin received according to the power required for charging the battery unit 21 so as to generate the second supplying voltage Vc and a charging current Ic to charge the battery unit 21. The charger unit 231 can be implemented by a charging circuit, wherein the charging circuit comprises of a voltage conversion circuit. It is worth to note that the circuitry structure associated with the charging circuit, as well as the generation of the second supplying voltage Vc and the charging current Ic are known arts to those skilled in the art, hence further descriptions are hereby omitted.

The switching unit 233 is configured to receive the first supplying voltage Vin and the second supplying voltage Vc outputted by the charger unit 231. The switching unit 233 is configured for operatively detecting the power consumption of the system load 25 and selectively supplying the first supplying voltage Vin or the second supplying voltage Vc to the voltage regulating unit 235.

The voltage regulating unit 235 is configured for supplying power to the system load 25. Specifically, the voltage regulating unit 235 is configured to convert the output of the switching unit 233 into the working voltages of the system load 25 such as 5 V, 1.7 V, 3.3 V or 2.5 V, for driving the system load based on the power operation requirement of the system load 25. The voltage regulating unit 235 can be implemented by a voltage regulator a voltage regulating circuit.

In the instant embodiment, the switching unit 233 is operative to selectively supply the first supplying voltage Vin outputted from the power adapter 1 or the second supplying voltage Vc outputted from charger unit 231 to the voltage regulating unit 235 according to the power consumption of the system load 25 for powering the operation of the system load 25.

More specifically, the switching unit 233 operatively supplies the first supplying voltage Vin to the voltage regulating unit 235 under a heavy load condition and supplies the second supplying voltage Vc to the voltage regulating unit 235 under a light load condition. The power consumption of the system load 25 under the heavy load condition is greater than the power consumption of the system load 25 under the light load condition.

In short, the switching unit 233 utilizes the conventional power supplying method to supply power to the system load 25 under the heavy load condition. The switching unit 233 utilizes the NVDC power supplying method to supply power to the system load 25 under the light load condition. The power supplying efficiency of the power supplying system can therefore be enhanced.

It is worth to note that in the instant embodiment, the heavy load condition indicates that the power consumption of the system load 25 is greater than an upper power limit P_IH. The light load condition indicates that the power consumption of the system load 25 is less than a lower power limit P_IL. Moreover, when the power consumption of the system load 25 lies between the upper power limit P_IH and the lower power limit P_IL, the switching unit 233 maintains the power source for the voltage regulating unit 235. The upper power limit P_IH is greater than the lower power limit P_IL.

In other word, while the switching unit 233 supplies the first supplying voltage Vin to the voltage regulating unit 235, so long as the power consumption of the system load 25 is greater than the lower power limit P_IL, the switching unit 233 continued to supply the first supplying voltage Vin to the voltage regulating unit 235. Likewise, while the switching unit 233 supplies the second supplying voltage Vc to the voltage regulating unit 235, so long as the power consumption of the system load 25 is less than the upper power limit P_IN, the switching unit 233 continued to supply the first supplying voltage Vin to the voltage regulating unit 235.

In addition, when the switching unit 233 detects that the power consumption of the system load 25 gradually increases and enters the heavy load condition, the switching unit 233 supplies the first supplying voltage Vin to the voltage regulating unit 235. When the switching unit 233 detects that the power consumption of the system load 25 gradually decreases and enters the light load condition, the switching unit 233 supplies the second supplying voltage Vc to the voltage regulating unit 235.

Accordingly, the switching unit 233 can effectively prevent the occurrence of rapid switching between the NVDC power supplying method and the conventional power supplying method due to false detection when the operation of the system load 25 is unstable and enhance the operational efficiency of the power supplying structure.

Figure 2:
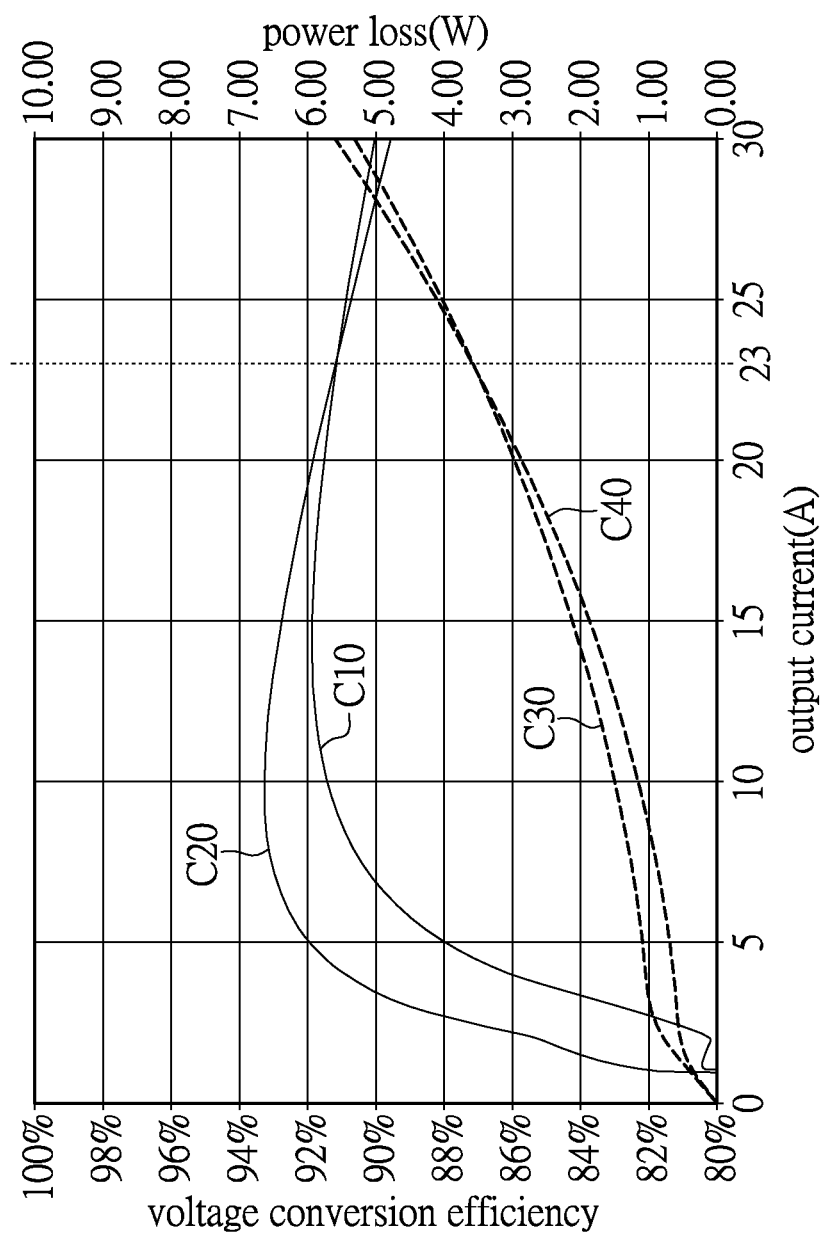
FIG. 2 is a graph illustrating a comparison of the power conversion efficiency between a narrow voltage direct current power supplying structure and a conventional power supplying structure provided according to the exemplary embodiment of the present disclosure.

It is worth to note that the upper power limit P_IH and the lower power limit P_IL can be configured according to the power consumption and power loss generated by the portable computer apparatus during operation. Please refer FIG. 2 in conjunction with FIG. 1. FIG. 2 shows a graph illustrating a comparison of the power conversion efficiency between a narrow voltage direct current power supplying structure and a conventional power supplying structure provided according to the exemplary embodiment of the present disclosure. FIG. 2 is generated with the first supplying voltage Vin received from the power adapter 1 being 19 V, and the second supplying voltage Vc outputted by the charger unit 231 being 7.4 V.

Curve C10 represents the voltage conversion efficiency for supplying power to the system load 25 using the conventional power supplying method. Curve C20 represents the voltage conversion efficiency for supplying power to the system load 25 using the NVDC power supplying method. Curve C30 represents the power loss for supplying power to the system load 25 using the conventional power supplying method. Curve C40 represents the power loss for supplying power to the system load 25 using the NVDC power supplying method.

It can be noted from curves C10 and C20 in FIG. 2, when the voltage regulating unit 235 outputs the output current IL approximately 23 amperes (A), the difference in the voltage conversion performance between the voltage conversion efficiency performances of the NVDC power supplying method and the conventional power supplying method becomes prominent. Particularly, the voltage conversion efficiency of the NVDC power supplying method is greater than the voltage conversion efficiency of the conventional power supplying method when the output current IL outputted by the voltage regulating unit 235 is less than 23 A. The voltage conversion efficiency of the NVDC power supplying method is less than the voltage conversion efficiency of the conventional power supplying method when the output current IL outputted by the voltage regulating unit 235 is greater than 23 A.

Hence, the upper power limit P_IH and the lower power limit P_IL can be configured according to the power consumption of the system load 25 when the output current IL is approximately 23 A.

Taking the center processing unit (CPU) of the system load 25 as example, the working voltage of the center processing unit is in general approximately 1.7V. That is, the power consumption of the center processing unit is approximately 39 watt (W) when the output current IL is approximately 23 A. Thus, the upper power limit P_IH can be configured to be 42.5 W based on the output current IL being 25 A. The lower power limit P_IL can be configured to be 35.7 W based on the output current IL being 21 A.

When the power consumption of the system load 25 determined is greater than 42.5 W (i.e., the output current IL is greater than or equal to 25 A), the switching unit 233 determines that the system load 25 operates under the heavy load condition and supplies the first supplying voltage Vin to the voltage regulating unit 235. When the power consumption of the system load 25 determined is less than 35.7 W (i.e., the output current IL is less than or equal to 21 A), the switching unit 233 determines that the system load 25 operates under the light load condition and supplies the second supplying voltage Vc to the voltage regulating unit 235.

More specifically, the switching unit 233 further includes a power switching circuit 2331 and a control unit 2333. The power switching circuit 2331 is coupled to the power terminal PT, the output of the charging unit 231, and the voltage regulating unit 235. The power switching circuit 2331 is further coupled to the control unit 2333.

The power switching circuit 2331 is configured for establishing a first power supplying path between the power terminal PT and the voltage regulating unit 235 or establishing a second power supplying path between the charger unit 231 and the voltage regulating unit 235.

The control unit 2333 is configured to operatively detect the power consumption of the system load 25 according to a detection signal LOAD_DET received. The control unit 2333 operatively controls the power switching unit 2331 to selectively conduct the first power supplying path or the second power supplying path to supply the first supplying voltage Vin or the second supplying voltage Vc to the voltage regulating unit 235.

In short, the control unit 2333 of the switching unit 233 operatively causes the power switching unit 2331 to conduct the first power supplying path and supply the first supplying voltage Vin to the voltage regulating unit 235 in response to the detection signal LOAD_DET indicating that the system load 25 is operating under the heavy load condition. The control unit 2333 of the switching unit 233 causes the power switching unit 2331 to conduct the second power supplying path and supply the second supplying voltage Vc to the voltage regulating unit 235 in response to the detection signal LOAD_DET indicating that the system load 25 is operating under the light load condition.

It is worth noting that the detection signal LOAD_DET corresponds to the power consumption of the system load 25. The detection signal LOAD_DET can be generated according to the output voltage VL and the output current IL being outputted by the voltage regulating unit 235. The control unit 2333 can be configured to regularly (e.g., every preset time such as every 240 ms) determine the power consumption of the system load 25 according to the detection signal LOAD_DET and decide method for supplying power to the system load 25.

In one embodiment, the detection signal LOAD_DET can be generated by a current detection component (not shown). To put it concretely, the current detection component can be coupled between the voltage regulating unit 235 and the control unit 2333. The current detection component generates the detection signal LOAD_DET responsive to the output current IL outputted by the voltage regulating unit 235. The current detection component operable to generate the voltage signal serving as the detection signal LOAD_DET responsive to the output current IL outputted by the voltage regulating unit 235 and output the detection signal LOAD_DET to the control unit 2333 for the control unit 2333 to determine the power consumption of the system load 25. In the instant embodiment, the current detection component is a resistive element such as the resistor, but the present disclosure is not limited thereto.

For instance, the control unit 2333 can detect the voltage signal generated by the current detection component within a preset time interval (e.g., 240 ms) according to a predetermined sampling time (e.g., sample every 60 ms), and correspondingly records the output current IL. The control unit 2333 calculates the average power consumption of the system load 25 according to the output current IL averaged within the preset time interval, and determines the method for supplying power to the system load 25. It shall be note that the higher the sampling frequency (e.g., the shorter the time between each sampling time) within the preset time interval, the more representative the average power consumption computed is for the power presently consumed by the system load 25. A person with ordinary skill in art shall know method and implementation for configuring the sampling frequency based on the operation of the portable computer apparatus to accurately detect and determine the power consumption of the system load 25 and select the appropriate power supplying method so as to increase the voltage conversion efficiency of the power system in the portable computer apparatus.

Figure 3:
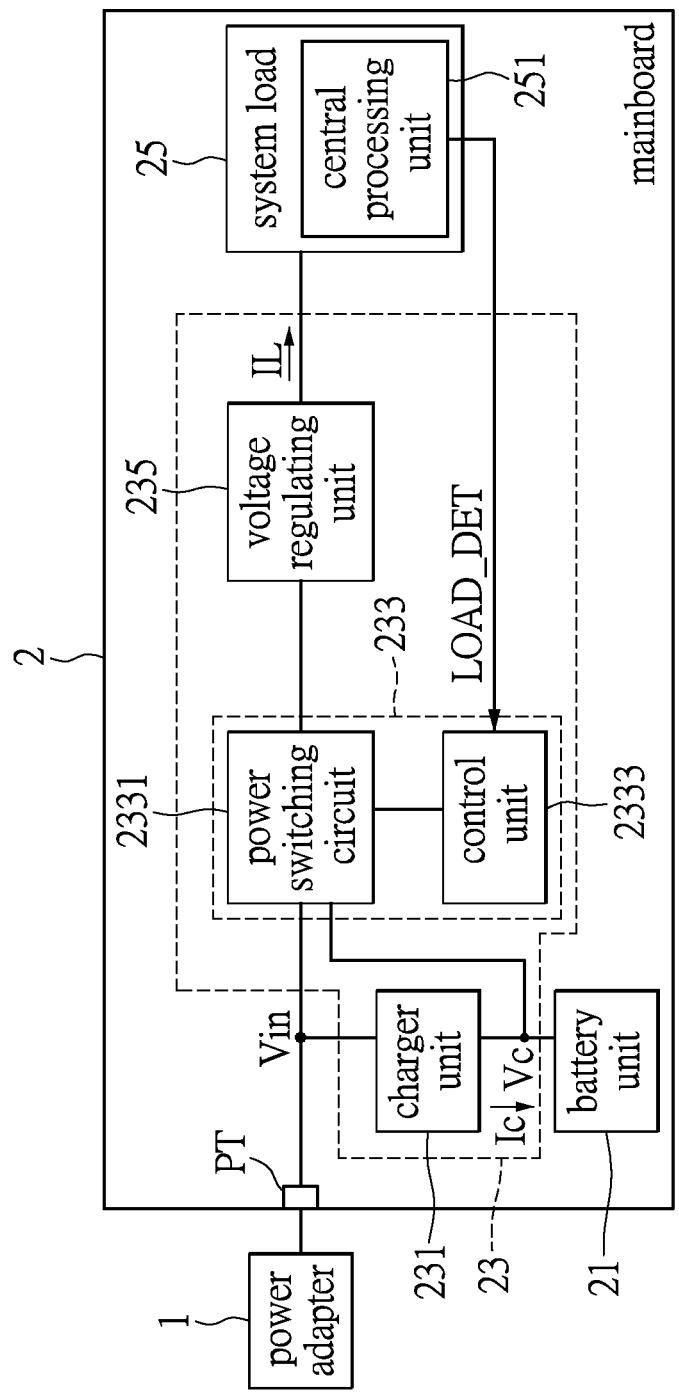
FIG. 3 is a block diagram of a power supplying system provided according to another exemplary embodiment of the present disclosure.

In another embodiment, the control unit 2333 can be coupled to the system load 25 to receive the detection signal LOAD_DET outputted from the system load 25 and determine the power consumption of the system load 25. Please refer FIG. 3, which shows a block diagram illustrating a power supplying system provided according to another exemplary embodiment of the present disclosure. The detection signal LOAD_DET can be provided by a central processing unit 251 of the system load 25. The central processing unit 251 can operatively generate the detection signal LOAD_DET responsive to the current system operation, and output the detection signal LOAD_DET to the control unit

2333. The detection signal LOAD_DET can for example be the state signal such as the processor power state or the global system state set forth in the advanced configuration and power interface (ACPI) specification. The control unit 2333 operatively determines the method for supplying power to the system load 25 based on the operation of the portable computer apparatus or the processor power state of the processor detected from the detection signal LOAD_DET received.

It shall be noted that the instant embodiment does not limit the generation method and the form of the detection signal LOAD_DET so long as the detection signal LOAD_DET relates to or corresponds to the power consumption of the system load 25. Based on the above explanation, a person with ordinary skill in art should be able to deduce the generation method of the detection signal LOAD_DET as well as the usage thereof. Hence further descriptions are hereby omitted.

It is worth to note that the control unit 2333 can be implemented by a processing chip such as a microcontroller or an embedded controller, programmed with necessary firmware to implement the aforementioned method of determining the power consumption of the system load 25 and configuring the power source for the system load 25. The present disclosure is not limited thereto. In one embodiment, the control unit 2333 can be configured to receive the detection signal LOAD_DET using a general purpose input (GPI) of the microcontroller or the embedded controller, and controls the operation of the power switching circuit 2331 using a general purpose output (GPO) of the microcontroller or the embedded controller.

Figure 4:
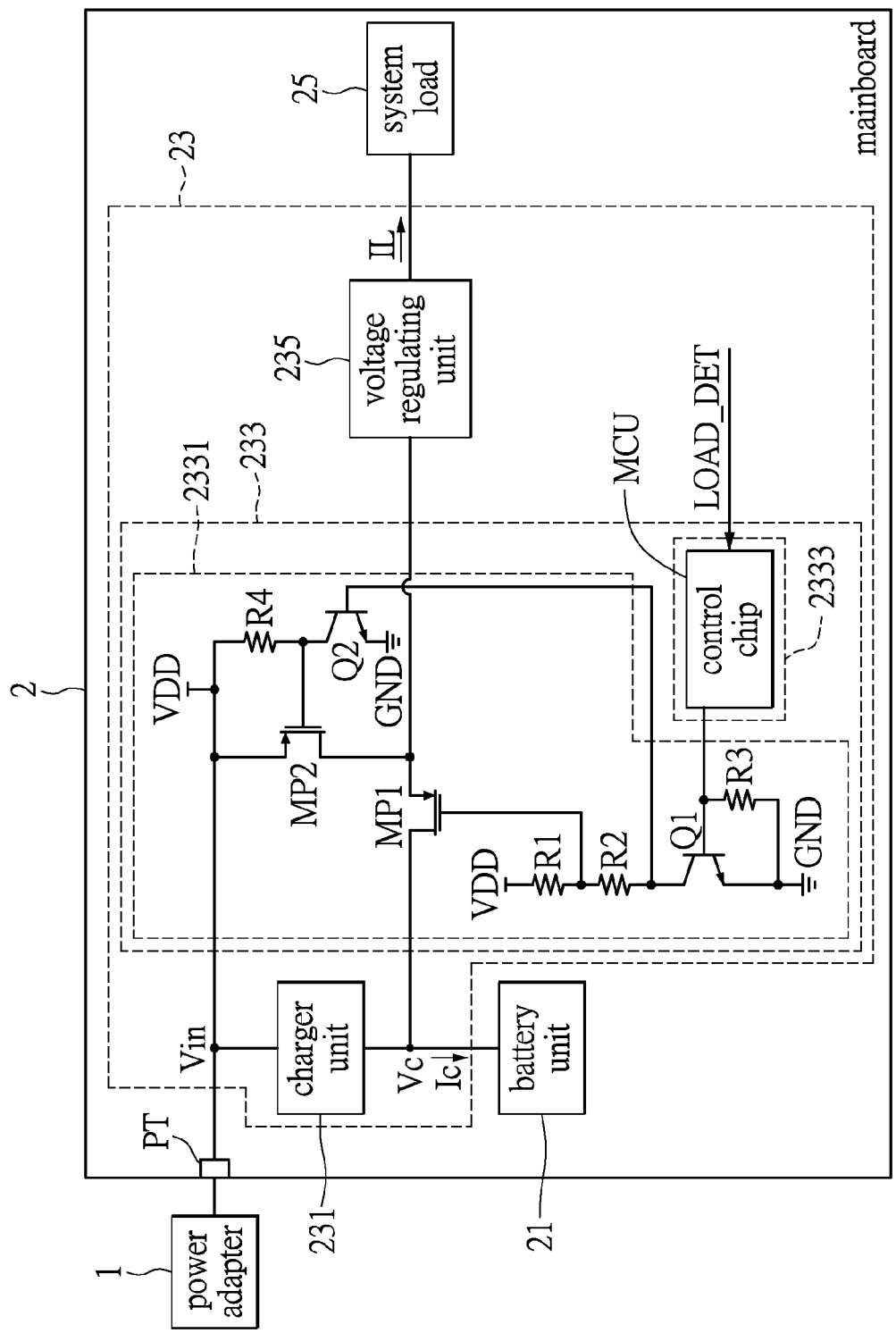
FIG. 4 shows a circuit diagram of a switching unit provided according to an exemplary embodiment of the present disclosure.

Detailed descriptions for the implementation and circuit operation for the switching unit 233 are provided in the following. Please refer FIG. 4 in conjunction with FIG. 1, and FIG. 4 shows a circuit diagram illustrating the switching unit provided according to an exemplary embodiment of the present disclosure.

In the instant embodiment, the power switching circuit 2331 includes NPN transistors Q1, Q2, PMOS transistors MP1,MP2, and resistors R1~R4; the control unit 2333 includes a control chip MCU, and a general purpose input of the control chip MCU is configured to receive the detection signal LOAD_DET.

In one implementation, the general purpose input of the control chip MCU can be configured to couple to the current detection component (not shown), and detects the power consumption of the system load 25 based on the outputs of the voltage regulating unit 235. In another implementation, the general purpose input of the control chip MCU can be configured to couple to the central processing unit (not shown in FIG. 4) of the system load 25, and detects the power consumption of the system load 25 based on the operational state (e.g., the power consumption) of the central processing unit.

A first end of the resistor R1 is configured to receive an operating voltage VDD. A second end of the resistor R1 is coupled to a first end of the resistor R2. The second end of the resistor R2 is coupled to a collector of the NPN transistor Q1. An emitter of the NPN transistor Q1 is coupled to a ground GND. A base of the NPN transistor Q1 is coupled to the general purpose output of the control chip MCU (not shown), and is controlled by the control chip MCU. A first end of the resistor R3 is coupled to the base of the NPN transistor Q1, and a second end of the resistor R3 is coupled to the ground GND. The resistor R3 is also coupled between the general purpose output of the control chip MCU and the ground GND. The resistor R3 serve as a pull-down resistor and operatively pulls down the general purpose output of the control chip MCU to the zero voltage level when either the control chip MCU is turned off or the general purpose output of the control chip MCU is floating. The resistor R3 further limits the amount of the current flow into the base of the NPN transistor Q1 to avoid the NPN transistor Q1 from being damaged due to excessive current and affect the operation of the power switching circuit 2331.

A drain of the PMOS transistor MP1 is coupled to the output terminal of the charger unit 231. A source of the PMOS transistor MP1 is coupled to the voltage regulating unit 235. A gate of the PMOS transistor MP1 is coupled to the output of the voltage division circuit formed of resistors R1 and R2. More specifically, the gate of the PMOS transistor MP1 is coupled to a junction between the resistors R1 and R2, and is controlled by the voltage at the junction between the resistors R1 and R2, wherein the voltage at the junction between the resistors R1 and R2 is equal to the operating voltage VDD subtract the voltage across the resistor R1.

Incidentally, a person with ordinary in the art should know the voltage outputted to the gate of the PMOS transistor MP1 to control the operation thereof can be configured by appropriately configuring the operating voltage VDD and selecting resistors R1 and R2.

A first end of the resistor R4 is configured to receive the operating voltage VDD. The first end of the resistor R4 is further coupled to the power terminal PT. A drain of the PMOS transistor MP2 is coupled to the source of the PMOS transistor MP1 and the voltage regulating unit 235. A source of the PMOS transistor MP2 is coupled to the power terminal PT. The source of the PMOS transistor MP2 is configured to receive the operating voltage VDD. A gate of the PMOS transistor MP2 is coupled to a collector of the NPN transistor Q2. The NPN transistor Q2 is configured to control the operation of the PMOS transistor MP2. The collector of the NPN transistor Q2 is further coupled to the second end of the resistor R4. A base of the NPN transistor Q2 is coupled to the collector of the NPN transistor Q1. In other word, the NPN transistor Q1 is configured for controlling the operation of the NPN transistor Q2. An emitter of the NPN transistor Q2 is coupled to the ground GND.

Figure 5:
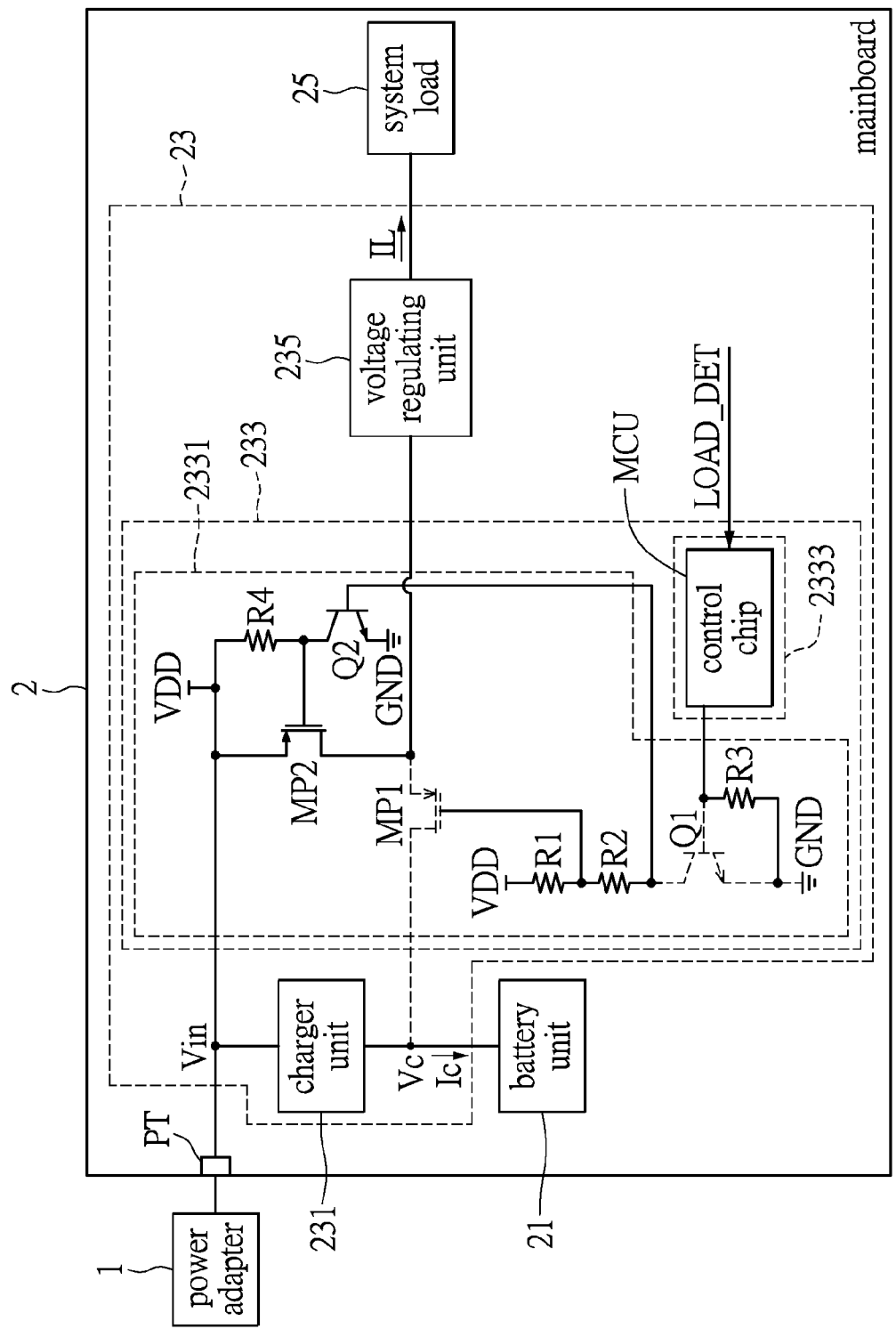
FIG. 5 is a graph illustrating a circuit operation of the switching unit provided according to the exemplary embodiment of the present disclosure.
Figure 6:
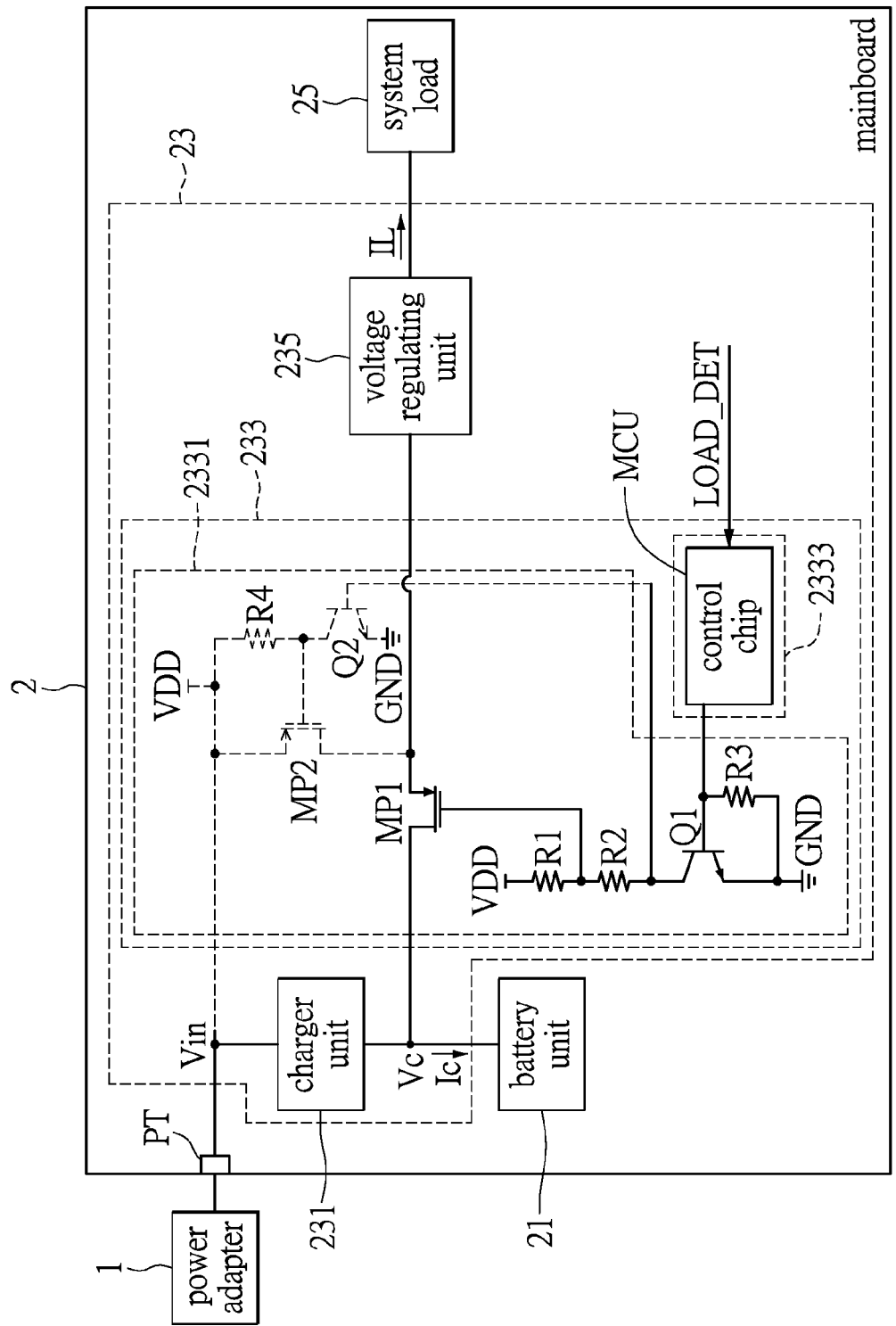
FIG. 6 is a diagram illustrating a circuit operation of the switching unit provided according to the exemplary embodiment of the present disclosure.

Please refer FIG. 5 and FIG. 6. FIG. 5 and FIG. 6 show diagrams illustrating the circuit operation of the switching unit provided according to the exemplary embodiment of the present disclosure, respectively.

When the control chip MCU determined that the system load 25 is operating under the heavy load condition, the control chip MCU outputs a control voltage of low voltage level via the general purpose output and causes the NPN transistor Q1 to cut-off as voltage across the base-emitter junction of the NPN transistor Q1 is less than the conducting voltage of the NPN transistor Q1 (e.g., 0.6~0.7 volt). The gate voltage of the PMOS transistor MP1 at this time is pulled up to the operating voltage by the resistor R1 and increases to a high voltage level which causes the PMOS transistor MP1 to cut-off as the source-gate voltage of the PMOS transistor MP1 become less than the conducting voltage of the PMOS transistor MP1. At the same time, the NPN transistor Q2 conducts as the voltage across the base-emitter junction is greater than the conducting voltage of the NPN transistor Q2, and pulls down the gate voltage of the PMOS transistor MP2 forming a first power supplying path. The first supplying voltage Vin outputted from the power adapter 1 is supplied to the voltage regulating unit 235 through the PMOS transistor MP2.

When the control chip MCU determined that the system load 25 is operating under the light load condition, the control chip MCU outputs a control voltage of high voltage level via the general purpose output and causes the NPN transistor Q1 to conduct as the voltage across the base-emitter junction is now greater than the conducting voltage of the NPN transistor Q1.

The NPN transistor Q1 conducts pull down the gate of the PMOS transistor MP1 to the ground GND and causes the PMOS transistor MP1 to conduct since the source-gate voltage of the PMOS transistor MP1 becomes greater than the conducting voltage of the PMOS transistor MP1. At the same time, the NPN transistor Q2 cuts off as the base of the NPN transistor Q2 is pulled down to the ground GND. The gate of the PMOS transistor MP2 is pulled up to the operating voltage through the resistor R4 which causes the voltage between the source and the gate to be less than the conduct voltage of the PMOS transistor MP2 and cut off the PMOS transistor MP2 forming a second power supplying path. The second supplying voltage Vc received from the charger unit 231 is supplied to the voltage regulating unit 235 through the PMOS transistor MP1.

In other word, when the system load 25 operates under the heavy load condition, the control chip MCU operatively causes the power switching circuit 2331 to establish the first power supplying path formed between the power adapter 1 and the voltage regulating unit 235 and cuts off the second power supplying path, so as to supply the first supplying voltage Vin to the voltage regulating unit 235. When the system load 25 operates under the light load condition, the control chip MCU operatively causes the power switching circuit 2331 to establish the second power supplying path formed between the charger unit 231 and the voltage regulating unit 235 and cuts off the first power supplying path so as to supply the second supplying voltage Vc to the voltage regulating unit 235.

It shall be noted that FIG. 2 is merely used to illustrate a comparison between the power conversion efficiency of a narrow voltage direct current power supplying method and the power conversion efficiency of a conventional supplying method, and the present disclosure is not limited thereto. FIG. 4 merely serves to illustrate a circuit implementation of the switching unit 233, and the present disclosure is not limited thereto. Similarly, FIG. 5 and FIG. 6 are diagrams used to illustrate circuit operations of the switching unit, and the present disclosure is not limited thereto. Moreover, the present disclosure does not limit the exact type, exact structure, implementation method and/or connection methods associated with the battery unit 21, the charging unit 231, the switching unit 233, and the voltage regulating unit 235.

It is worth to note that the coupling connections among the aforementioned components include either direct or indirect electrical connections and the scope of the present disclosure does not limit the type of connection employed as long as the choice type of connection selected is able to achieve the electrical signal transmission functionality. The techniques described in the aforementioned embodiments may be combined or used independently. Furthermore, the associated components may be added, deleted, modified or replaced base on the needs of specific design and functional requirements and the present disclosure should not be limited thereto. From the explanation of the aforementioned embodiment, those skilled in the art should be able to deduce the other embodiments according to the disclosure of the present disclosure, and further descriptions are therefore omitted.

From the aforementioned exemplary embodiments, the present disclosure further generalize a power supplying method which can be adapted to a power supplying circuit described in the aforementioned exemplary embodiments for managing the power supplying operation for the system load in a portable computer apparatus (e.g., a laptop or a tablet). The power supplying circuit can be disposed on a mainboard installed in the portable computer apparatus. The portable computer apparatus is configured to receive the output of the power adapter 1 through a built-in power terminal and supplies power to a built-in battery unit and the system load.

Figure 7:
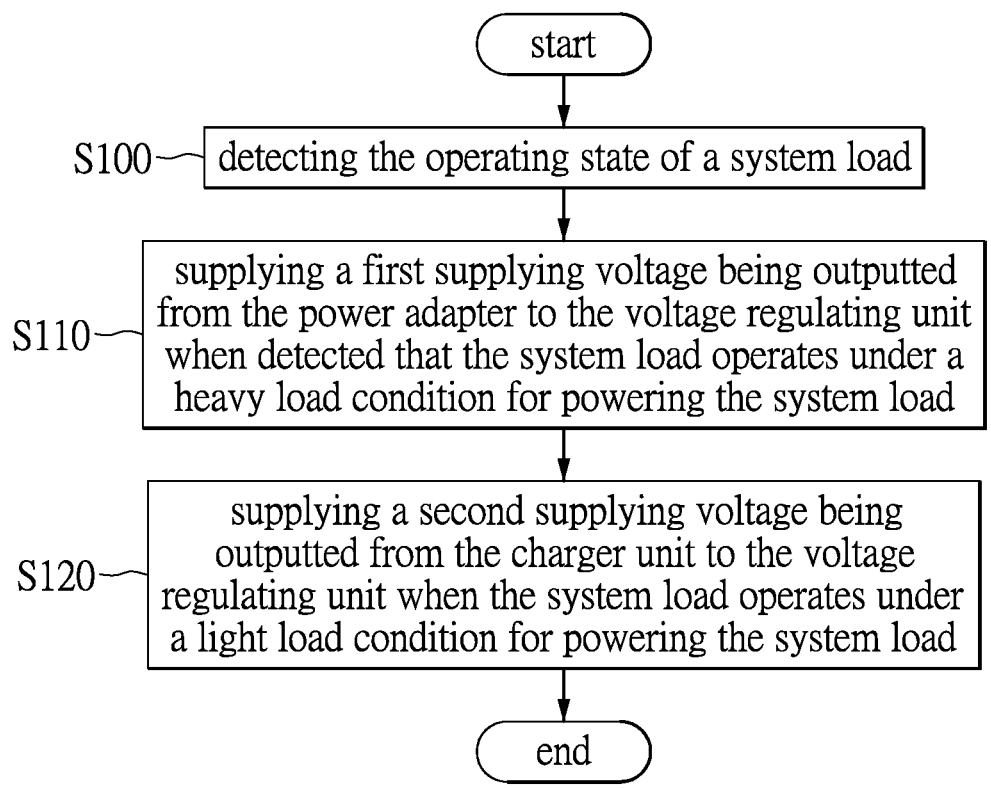
FIG. 7 is a flowchart illustrating a power supplying method for a power supplying system provided according to an exemplary embodiment of the present disclosure.

Please refer FIG. 7 in conjunction with FIG. 1, and FIG. 7 shows a flowchart illustrating a power supplying method for a power supplying system provided according to an exemplary embodiment of the present disclosure.

Firstly, in Step S100, the control unit 2333 of the switching unit 23 detects the operation of the system load 25 according to a detection signal LOAD_DET received. The detection signal LOAD_DET is configured to correspond to the power consumption of the system load 25.

In one embodiment, the detection signal LOAD_DET can be generated according to the output voltage VL and the output current IL being outputted by the voltage regulating unit 235. In another embodiment, the detection signal LOAD_DET can be generated and provided by a central process unit (CPU) (not shown) of the system load 25 based on the operation thereof. The generation method of the detection signal LOAD_DET has been described in detail in aforementioned embodiments, and further details are hereby omitted. The system load 25 can be an equivalent resistive element and used for representing all the power consumption components including the CPU, the system operating module (not shown) and periphery devices (not shown) disposed on the mainboard 2 which is built-in in the portable computer apparatus.

In Step S110, when the control unit 2333 determines that the system load 25 is operating under the heavy load condition according to the detection signal LOAD_DET, the control unit 2333 operatively drives the power switching circuit 2331 to output the first supplying voltage Vin received from the power adapter 1 to the voltage regulating unit 235. In detail, the control unit 2333 drives the power switching unit 2331 to establish the first power supplying path between the power adapter 1 and the voltage regulating unit 235 to supply the first supplying voltage Vin being outputted from the power adapter 1 to the voltage regulating unit 235 and supply power to the system load 25.

In Step S120, when the control unit 2333 determines that the system load 25 is operating under the light load condition according to the detection signal LOAD_DET, the control unit 2333 drives the power switching circuit 2331 to output the second supplying voltage Vc received from a charger unit 231 to the voltage regulating unit 235. In detail, the control unit 2333 drives the power switching unit 2331 to establish the second power supplying path between the charger unit 231 and the voltage regulating unit 235 to supply the second supplying voltage Vc being outputted from the charger unit 231 to the voltage regulating unit 235 and supply power to the system load 25.

The heavy load condition as previously described indicates that the power consumption of the system load 25 is greater than an upper power limit P_IH. The light load condition indicates that the power consumption of the system load 25 is less than a lower power limit P_IL. The upper power limit P_IH and the lower power limit P_IL as described previously can determined and configured by comparing the voltage conversion efficiency between the narrow voltage direct current power supplying method and the conventional power supplying method (shown in FIG. 2). Moreover, the upper power limit P_IH and the lower power limit P_IL can be predetermined and stored in a memory (not shown) of the control unit 2333 via firmware design.

The power supplying method depicted in FIG. 7 can be executed by the control unit 2333 of the power supplying circuit in the portable computer apparatus. Particularly, the control unit 2333 can be implemented by a processing chip such as a microcontroller or an embedded controller, which is programmed with programming codes associated with the power supplying method of FIG. 7 through firmware design, however, the present disclosure is not limited thereto.

From the aforementioned exemplary embodiments, the present disclosure can further generalize another power supplying method which can be adapted to a power supplying circuit described in the aforementioned exemplary embodiments for managing the power supplying operation for the system load in a portable computer apparatus (e.g., a laptop or a tablet). Please refer FIG. 8 in conjunction with FIG. 1, and FIG. 8 herein shows a flowchart illustrating a power supplying method for a power supplying system provided according to an another exemplary embodiment of the present disclosure.

In the instant embodiment, the control unit 2333 of the switching unit 23 pre-configures and stores the upper power limit P_IH and the lower power limit P_IL according to the actual power loss and the actual power consumption associated with the operation of the portable computer apparatus. The upper power limit P_IH is configured to be greater than the lower limit P_IL.

Firstly, in Step S201, the control unit 2333 of the switching unit 23 operatively detects the operation of the system load 25 according to a detection signal LOAD_DET received. The detection signal LOAD_DET is configured to correspond to the power consumption of the system load 25.

In Step S203, the control unit 2333 can first detects the instant power supplying operation of the portable computer apparatus. More specifically, the control unit 2333 can detects whether or not the power source is the power adapter 1. That is, the control unit 2333 detects whether the portable computer apparatus currently using the conventional power supplying method for the powering supplying operation. When the control unit 2333 detects that the power source for the system load 25 is the power adapter 1, the control unit 2333 executes Step S205. On the contrary, when the control unit 2333 detects that the power source for the system load 25 is the charger unit 231, the control unit 2333 executes Step S209.

In detail, when the portable computer apparatus initially starts, the power required to drive the system load 25 may be pre-configured to be supplied by the conventional supplying method. In other word, when the portable computer apparatus starts and detects that the electrical connection between the portable computer apparatus and the power adapter 1, the control unit 2333 may first drive the power switching circuit 2331 to establish the first power supplying path between the power adapter 1 and the voltage regulating unit 235 and supply the first supplying voltage Vin to the voltage regulating unit 235 as the operation of the system load 25 might be unstable.

In Step S205, when detected that the power source for the system load 25 is the power adapter 1, the control unit 2333 operatively detects whether the power consumption of the system load 25 is less than the predetermined lower power limit P_IL. When the power consumption of the system load 25 is determined to be less than the lower power limit P_IL predetermined, the control unit 2333 executes Step S207. On the contrary, when the power consumption of the system load 25 is determined to be greater than the lower power limit P_IL predetermined, the control unit 2333 returns to Step S201 and maintains the power source of the voltage regulating unit 235 while continues to detect the power consumption of the system load 25.

In Step S207, when the power consumption of the system load 25 is determined to be less than the lower power limit P_IL predetermined, indicates that the system load 25 is operating under the light load condition. The control unit 2333 drives the power switching circuit 2331 to cut off the first power supplying path and establishes the second power supplying path between the output terminal of the charger unit 231 and the voltage regulating unit 235 to supply the second supplying voltage Vc to the voltage regulating unit 235. Thereby, enhances the voltage convention efficiency of the portable computer apparatus under the light load condition.

In Step S209, when detected that the power source of the system load 25 is the charger unit 231, the control unit 2333 operatively detects whether the power consumption of the system load 25 is greater than the upper power limit P_IH predetermined. When the power consumption of the system load 25 is determined to be greater than the upper power limit P_IH predetermined, the control unit 2333 executes Step S211. On the contrary, when the power consumption of the system load 25 is determined to be less than the upper power limit P_IH predetermined, the control unit 2333 returns to the step S201 and maintains the power source of the voltage regulating unit 235 while continues to detect the power consumption consumed by the system load 25.

In Step S211, when the power consumption consumed by the system load 25 is determined to be greater than the upper power limit P_IH predetermined, indicates that the system load 25 is operating under the heavy load condition. The control unit 2333 operatively drives the power switching circuit 2331 to cut off the second power supplying path and establishes the first power supplying path between the power adapter 1 and the voltage regulating unit 235 to supply the first supplying voltage Vin to the voltage regulating unit 235. Thereby, enhances the voltage convention efficiency of the portable computer apparatus under the heavy load condition.

Figure 8:
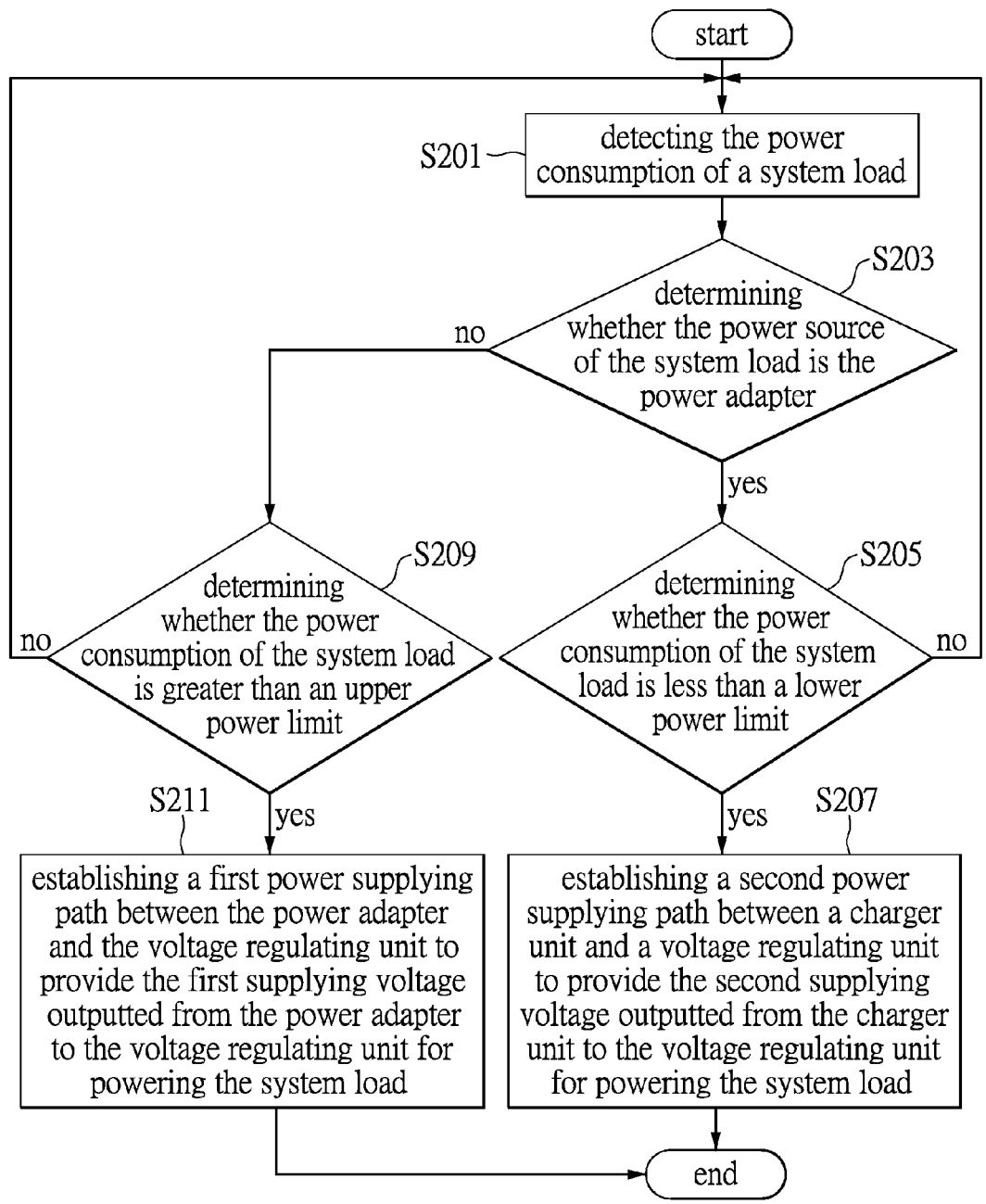
FIG. 8 is a flowchart illustrating a power supplying method for a power supplying system provided according to an exemplary embodiment of the present disclosure.

In short, as depicted by the power supplying method of FIG. 8, when the power source of the system load 25 is the power adapter 1, so long as the power consumption of the system load 25 is greater than the lower power limit P_IL, the control unit 2333 of the switching unit 233 continues to drive the power switching circuit 2331 to conduct the first power supplying path and supply the first supplying voltage Vin to the voltage regulating unit 235. Similarly, when the power source of the system load 25 is the charger unit 231, so long as the power consumption of the system load 25 is less than the upper power limit P_IH, the control unit 2333 of the switching unit 233 continues to drives the power switching circuit 2331 to conduct the second power supplying path and supply the second supplying voltage Vc to the voltage regulating unit 235.

In other word, when the power consumption of the system load 25 lies between the upper power limit P_IH and lower power limit P_IL predetermined, the control unit 2333 of the switching unit 233 maintains the power source of the voltage regulating unit 235. Accordingly, the switching unit 233 can effectively prevent the occurrence of rapid switching between the narrow voltage direct current power supplying method and the conventional supplying method due to false detection when the operation of the system load is unstable; thereby enhance the operational efficiency of the power supplying structure. Hence, the voltage convention efficiency of the portable computer apparatus in operation can be enhanced, which further enhances the applicability of the power supplying circuit.

Figure 9:
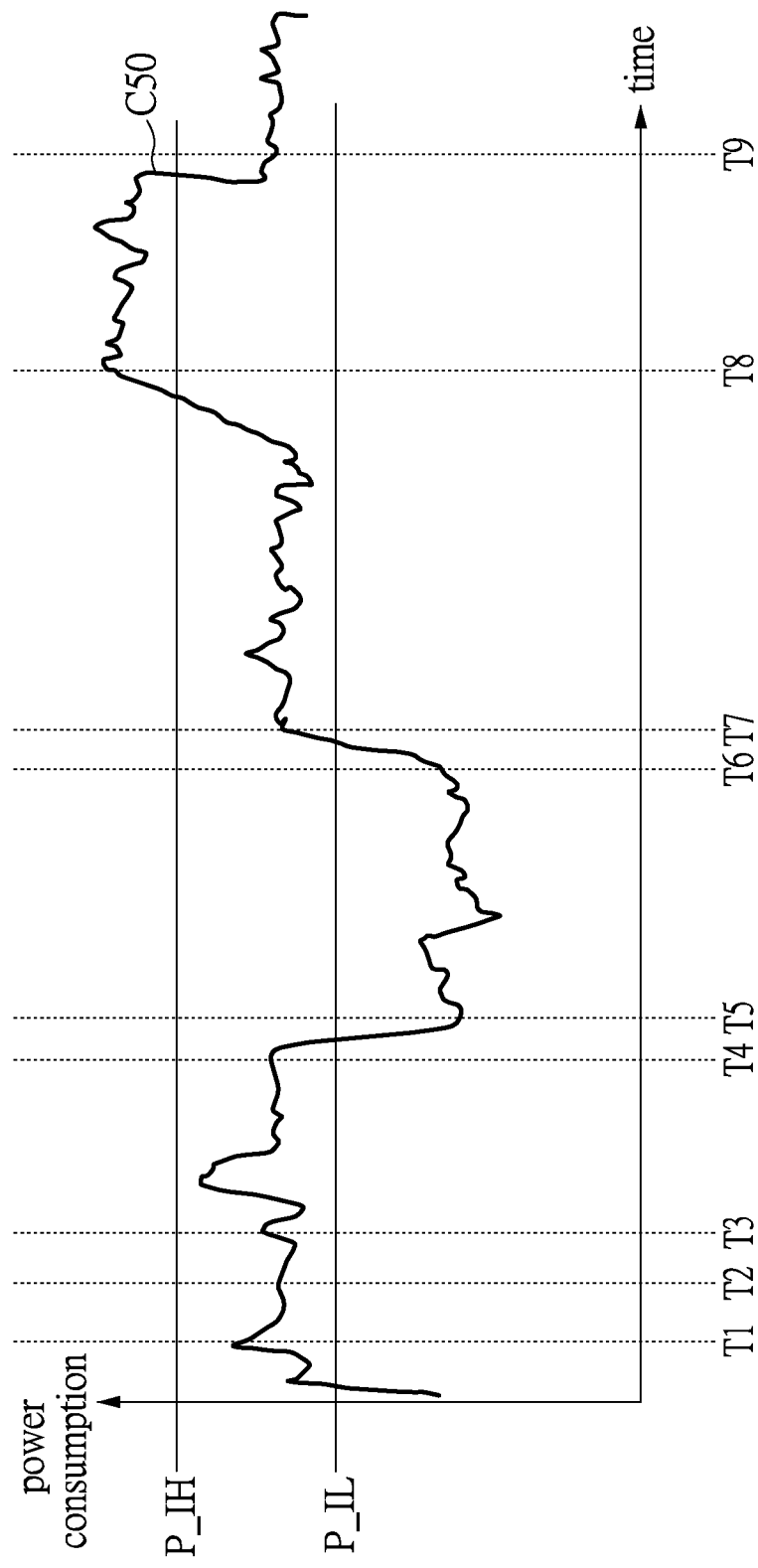
FIG. 9 is a graph illustrating a circuit operation of a power supplying system provided according to an exemplary embodiment of the present disclosure.

The operation of the power supplying method in FIG. 8 can be further illustrated as following. Please refer FIG. 9 in conjunction with FIG. 1 and FIG. 8, FIG. 9 shows a graph illustrating a circuit operation of the power supplying system provided according to an exemplary embodiment of the present disclosure. Curve C50 represents the power consumption of the system load 25 in the portable computer apparatus.

At time point T1, the power supplying circuit of the portable computer apparatus uses the first supplying voltage Vin supplied by the power adapter 1 (e.g., 19V) as the power source for the system load 25.

As shown in FIG. 9, when the control unit 2333 determines that the power consumption of the system load 25 lies between the power upper limit P_IH and the power lower limit P_IL, the control unit 2333 of the switching unit 23 drives the power switching circuit 2331 to maintain the power source of the voltage regulating unit 235. In other word, the control unit 2333 drives the power switching circuit 233 to continue to conduct the first power supplying path, and supply the first supplying voltage Vin outputted by the power adapter 1 to the voltage regulating unit 235.

When the control unit 2333 determines that the power consumption of the system load 25 decreases gradually and become less than the power lower limit P_IL according to the detection signal LOAD_DET, indicating that the system load 25 enters the light load condition (e.g., time point T4~T5), the control unit 2333 operatively drives the power switching circuit 2331 to supply the second supplying voltage Vc (e.g., 7.4V) outputted by the charger unit 231 to the voltage regulating unit 235 to supply power to the system load 25 upon detected that the power consumption of the system load 25 is less than the power lower limit P_IL (e.g., at time point T5).

Although the control unit 2333 detects that the power consumption gradually increases according to the detection signal LOAD_DET received between time point T6~T7, however, since the power consumption of the system load 25 is not greater than the upper power limit P_IH, the control unit 2333 thus drives the power switching circuit 2331 to maintain the power source of the voltage regulating unit 235. In other word, the control unit 2333 drives the power switching circuit 233 to conduct the second power supplying path and supply the second supplying voltage Vc outputted by the power adapter 1 to the voltage regulating unit 235.

When the control unit 2333 determines that the power consumption of the system load 25 is greater than the power upper limit P_IH, according to the detection signal LOAD_DET, indicating that the system load 25 enters the heavy load condition (e.g., at time point T8), the control unit 2333 operatively drives the power switching circuit 2331 to supply the first supplying voltage Vin (e.g. 19V) outputted by the power adapter 1 to the voltage regulating unit 235 to supply power to the system load 25.

At time point T8, although the control unit 2333 detects that the power consumption gradually decreases according to the detection signal LOAD_DET, however, since the power consumption of the system load 25 is not less than the lower power limit P_IL, the control unit 2333 thus drives the power switching circuit 2331 to maintain the power source of the voltage regulating unit 235. In other word, the control unit 2333 drives the power switching circuit 233 to conduct the first power supplying path and supply the first supplying voltage Vin outputted by the power adapter 1 to the voltage regulating unit 235.

In other word, when the control unit 2333 detects that the power consumption of the system load 25 gradually decreases and enters the light load condition, the control unit 233 drives the power switching circuit 2331 to supply the second supplying voltage Vc to the voltage regulating unit 235. When the control unit 2333 detects that the power consumption of the system load 25 gradually increases and enters the heavy load condition, the control unit 233 drives the power switching circuit 2331 to supply the first supplying voltage Vin to the voltage regulating unit 235.

It is worth to note that the upper power limit P_IH and the lower power limit P_IL as previously described can be determined and configured according to the actual power loss and the actual power consumption associated with the operation of the portable computer apparatus. The upper power limit P_IH and the lower power limit P_IL can be pre-configured and stored in a memory (not shown) of the control unit 2333 via firmware design.

Figure 10:
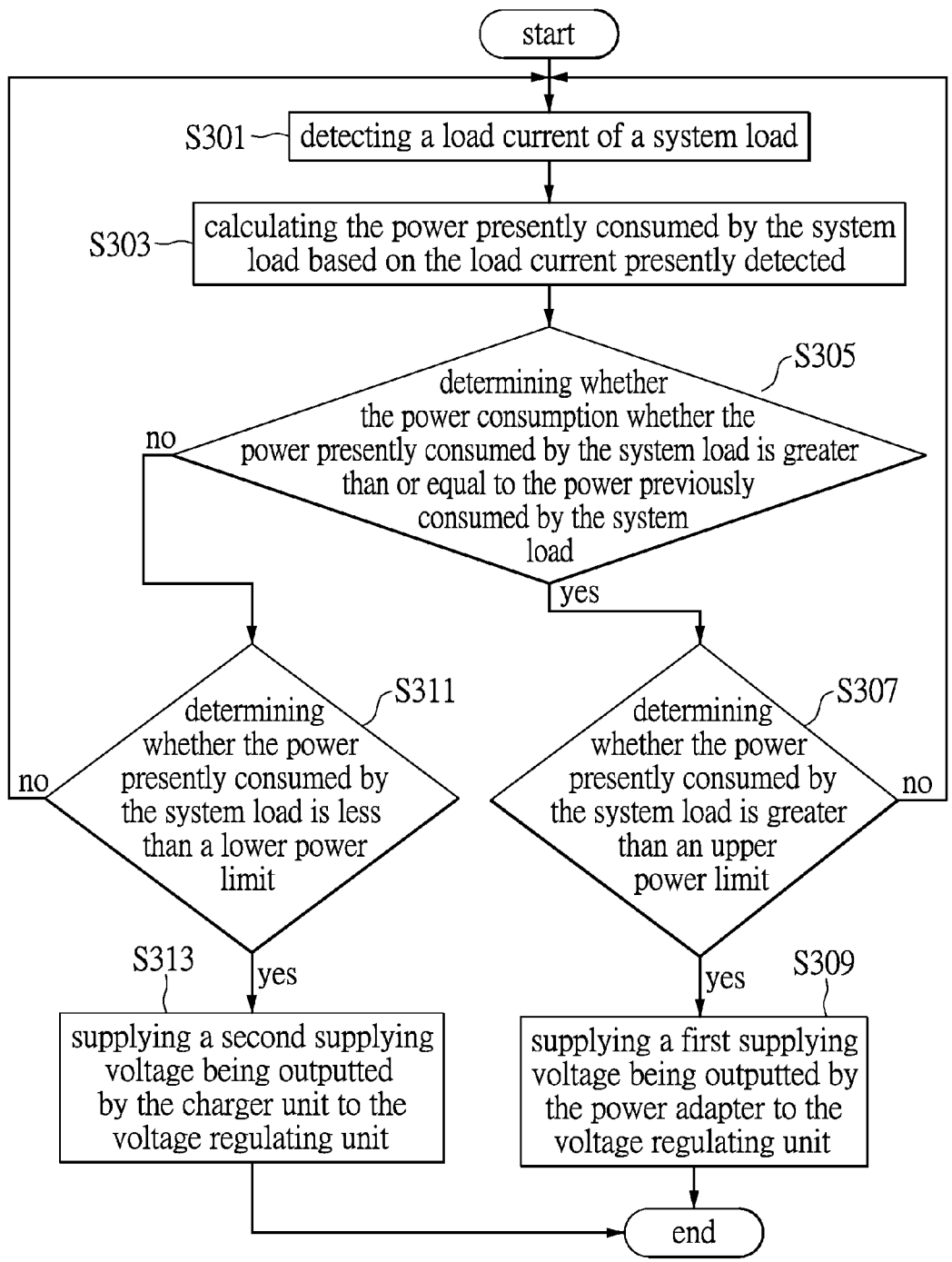
FIG. 10 is a flowchart illustrating a power supplying method for a power supplying system provided according to another exemplary embodiment of the present disclosure.

From the aforementioned exemplary embodiments, the present disclosure can further generalize another power supplying method which can be adapted to the aforementioned power supplying circuit described in the aforementioned exemplary embodiments for managing the power supplying operation for the system load in a portable computer apparatus (e.g. a laptop or a tablet). Please refer FIG. 10 in conjunction with FIG. 1, and FIG. 10 shows a flowchart illustrating a power supplying method for a power supplying system provided according to another exemplary embodiment of the present disclosure.

In the instant embodiment, the upper power limit P_IH and the lower power limit P_IL as described above can be predetermined and configured in the control unit 2333 of the switching unit 23 according to the actual power loss and the actual power consumption associated with the operation of the portable computer apparatus operates. The upper power limit P_IH is configured to be greater than the lower limit P_IL.

In Step S301, the control unit 2333 operatively detects the load current of the system load 25 regularly (e.g., at every preset time such as 60 ms) according to detection signal LOAD_DET received. In Step S303, the control unit 2333 calculates and records the power presently consumed by the system load 25 based on the load current presently detected (i.e., the output current IL received from the voltage regulating unit 235) and the output voltage VL of the voltage regulating unit 235 detected.

The control unit 2333 calculates the average power consumption of the multiple power consumptions of the system load 25 (e.g., four power consumptions) recorded after the preset time (e.g., 240 ms) and uses the average power consumption to represent the power presently consumed by the system load 25. In another embodiment, the control unit 2333 may also use the last power consumption of the system load 25 detected within the preset time as the power consumed by the system load 25.

Then, in Step S305, the control unit 2333 determines whether the power presently consumed by the system load 25 is greater than or equal to the power previously consumed. Specifically, when the control unit 2333 determines that the power presently consumed by the system load 25 is greater than or equal to the power previously consumed, the control unit 2333 executes the step S307. On the contrary, when the control unit 2333 determines that the power presently consumed by the system load 25 is less than the power previously consumed, the control unit 2333 executes the step S311.

In Step S307, the control unit 2333 further determines whether the power presently consumed by the system load 25 is greater than a predetermined upper power limit P_IH. When the control unit 2333 determines that the power presently consumed by the system load 25 is greater than a predetermined upper power limit P_IH, the control unit 2333 executes Step S309. On the contrary, when control unit 2333 determines that the power presently consumed by the system load 25 is less than the predetermined upper power limit P_IH, the control unit 2333 drives the power switching circuit 2331 to maintain the power source of the voltage regulating unit 235 and returns Step S301.

In Step S309, when the control unit 2333 determines that the system load 25 is operating under the heavy load condition, the control unit 2333 drives the power switching circuit 2331 to operatively supply the first supplying voltage Vin (e.g. 19V) to the voltage regulating unit 235 to supply power to the system load 25. The control unit 2333 replaces the power consumption of the system load detected previously with the power consumption of the system load presently detected.

In Step S311, the control unit 2333 determines whether the power presently consumed by the system load 25 is less than a predetermined lower power limit P_IL. When the control unit 2333 determines that the power presently consumed by the system load 25 is less than a predetermined lower power limit P_IL, the control unit 2333 executes Step S313. On the contrary, when control unit 2333 determines that the power presently consumed by the system load 25 is greater than the predetermined lower power limit P_IL, the control unit 2333 drives the power switching circuit 2331 to maintain the power source of the voltage regulating unit 235 and returns to the step S301.

In Step S313, when The control unit 235 determines that the system load 25 is operating under the light load condition, the control unit 2333 drives the power switching circuit 2331 to supply the second supplying voltage Vin (e.g., 7.4V) to the voltage regulating unit 235 to supply the system load 25. The control unit 2333 replaces the power consumption of the system load detected previously with the power consumption of the system load presently detected.

The power supplying method of FIG. 10 can be executed by the control unit 2333 of the power supplying circuit of the portable computer apparatus. The control unit 2333 can be implemented by a processing chip such as a microcontroller or an embedded controller, which is programmed with programming codes associated with the power supplying method of FIG. 10, through firmware design, however, the present disclosure is not limited thereto.

It shall be noted that the instant FIG. 10 is merely used for describing the power supplying method for the power supplying circuit disposed in the portable computer apparatus, and the present disclosure is not limited thereto.

In summary, exemplary embodiments of the present disclosure provides a power supplying circuit, a power supplying system and a power supplying method. The power supplying circuit, the power supplying system, and the power supplying method are configured to actively detect the system power consumption while the portable computer apparatus is in operation, and determine a power source for the system operation of the portable computer apparatus. When the system power consumption of the portable computer apparatus is relatively large, the power supplying circuit automatically selects the conventional power supplying method for powering the system; when the system power consumption of the portable computer apparatus is relatively small, the power supplying circuit automatically selects the narrow voltage direct current power supplying method for powering the system. Accordingly, the portable computer apparatus can effectively enhance the voltage conversion efficiency of the system operation by having the power supplying circuit installed therein. At the same time the life of the charging battery can be increased, thereby enhances increases the overall operation efficiency of the portable computer apparatus.

In addition, the portable computer apparatus of the present disclosure can flexibly sets the condition for switching between the conventional power supplying method and the narrow direct current power supplying method by configuring an upper power limit and a lower power limit. Thus, the present disclosure can effectively prevent the occurrence of rapid switching between the NVDC power supplying method and the conventional power supplying method due to false detection; thereby enhance the operational efficiency of the power supplying structure.

The descriptions illustrated supra set forth simply the preferred embodiments of the present disclosure; however, the characteristics of the present disclosure are by no means restricted thereto. All changes, alternations, or modifications conveniently considered by those skilled in the art are deemed to be encompassed within the scope of the present disclosure delineated by the following claims.

What is claimed is:

1. A power supplying circuit, adapted for receiving an output from a power adapter and supplying power to a battery unit and a system load, the power supplying circuit comprising:
    a charger unit configured to receive a first supplying voltage from the power adapter through a power terminal, and charge the battery unit;
    a switching unit coupled to the power terminal and an output terminal of the charger unit, and configured for operatively receiving the first supplying voltage and a second supplying voltage from the charger unit; and
    a voltage regulating unit coupled to the switching unit, and configured for supplying power to the system load;
    wherein the switching unit comprises:
        a power switching circuit coupled to the power terminal, the output terminal of the charger unit, and the voltage regulating unit, and configured for establishing a first power supplying path between the power terminal and the voltage regulating unit or establishing a second power supplying path between the charger unit and the voltage regulating unit; and
        a control unit coupled to the power switching unit and the voltage regulating unit, the control unit configured to detect the power consumption of the system load, under a heavy load condition, the control unit controlling the power switching unit to conduct the first power supplying path to supply the first voltage supplying voltage to the voltage regulating unit, under a light load condition, the control unit controlling the power switching unit to conduct the second power supplying path to supply the second voltage supplying voltage to the voltage regulating unit, wherein the control unit determines the power consumption of the system load based on an output current outputted from the voltage regulating unit;

wherein the power consumption of the system load under the heavy load condition is greater than the power consumption of the system load under the light load condition.

2. The power supplying circuit according to claim 1, wherein the heavy load condition indicates that the power consumption of the system load is greater than an upper power limit; the light load condition indicates that the power consumption of the system load is less than a lower power limit, wherein when the power consumption of the system load lies between the upper power limit and the lower power limit, the switching unit maintains the power source of the voltage regulating unit; wherein the upper power limit is greater than the lower power limit.

3. The power supplying circuit according to claim 1, wherein when the power consumption of the system load gradually increases and enters the heavy load condition, the switching unit supplies the first supplying voltage to the voltage regulating unit; when the power consumption of the system load gradually decreases and enters the light load condition, the switching unit supplies the second supplying voltage to the voltage regulating unit.

4. The power supplying circuit according to claim 1, wherein the control unit is coupled to the system load and the control unit determines the power consumption of the system load according to a detection signal received from the system load.

5. The power supplying circuit according to claim 1, wherein the control unit actively detects the power consumption of the system load at a predetermined time, and correspondingly controls the operation of the power switching circuit.

6. The power supplying circuit according to claim 1, wherein the power switching circuit comprises:
   a first resistor, a first end of the first resistor configured to receive an operating voltage;
   a second resistor, a first end of the second resistor coupled to a second end of the first resistor;
   a first NPN transistor, a collector of the first NPN transistor coupled to a second end of the second resistor, an emitter of the first NPN transistor coupled to a ground, and a base of the first NPN transistor coupled to the control unit;
   a third resistor coupled between the base of the first NPN transistor and the ground;
   a first PMOS transistor, a drain of the first PMOS transistor coupled to the output terminal of the charger unit, a gate of the first PMOS transistor coupled to the second end of the first resistor, and a source of the first PMOS transistor coupled to the voltage regulating unit;
   a second PMOS transistor, a drain of the second PMOS transistor coupled to the source of the first PMOS transistor and the voltage regulating unit, a source of the second PMOS transistor coupled to the power terminal and the operating voltage, and a gate of the second PMOS transistor coupled to a second end of a fourth resistor; and
   a second NPN transistor, a collector of the second NPN transistor coupled to the operating voltage through the fourth resistor, the collector of the second NPN transistor also coupled to the gate of the second PMOS transistor, an emitter of the second NPN transistor coupled to the ground, and a base of the second NPN transistor coupled to the collector of the first NPN transistor.

7. A power supplying method, adapted for the power supplying circuit according to claim 1, the power supplying method comprising:
   detecting an output current being outputted from a voltage regulating unit and supplied to a system load;
   calculating the power consumption of the system load based on the output current of the voltage regulating unit; and
   determining the operating state of the system load according to the power consumption of the system load;
   when the system load operates under a heavy load condition, the switching unit is caused to establish a first power supplying path between the power terminal and the voltage regulating unit for supplying the first supplying voltage to the voltage regulating unit; and
   when the system load operates under a light load condition, the switching unit is caused to establish a second power supplying path between the charger unit and the voltage regulating unit for supplying the second supplying voltage to the voltage regulating unit;
   wherein the power consumption of the system load operates under the heavy load condition is greater than the power consumption of the system load operates under the light load condition.

8. The power supplying method according to claim 7, wherein the step of detecting the operating state of the system load by detecting the power consumption of the system load comprises:
   determining that the system load operates under the heavy load condition when determined that the power consumption of the system load is greater than an upper power limit;
   determining that the system load under the light load condition when determined that the power consumption of the system load is less than a lower power limit; and
   when the power consumption of the system load lies between the upper power limit and the lower power limit, the switching unit maintains the power source for the voltage regulating unit.

9. The power supplying method according to claim 8, further comprising:
   when the power consumption of the system load gradually increases and enters the heavy load condition, the switching unit supplies the first supplying voltage to the voltage regulating unit; and
   when the power consumption of the system load gradually decreases and enters the light load condition, the switching unit supplies the second supplying voltage to the voltage regulating unit.

10. A power supplying system, comprising:
   a power adapter coupled to an AC power source, and the power adapter being configured for rectifying an AC voltage of the AC power source to generate a first supplying voltage; and
   a power supplying circuit, configured to operatively receive an output from the power adapter, and supply power to a battery unit and a system load, the power supplying circuit comprising:
   a charger unit, configured to receive the first supplying voltage from the power adapter through a power terminal, and operatively charge the battery unit;
   a switching unit coupled to the power terminal and an output terminal of the charger unit, and configured for operatively receiving the first supplying voltage and a second supplying voltage from the charger unit; and a voltage regulating unit coupled to the switching unit, and configured for supplying power to the system load; wherein the switching unit comprises:
- a power switching circuit, coupled to the power terminal, the output terminal of the charger unit and the voltage regulating unit, and configured for establishing a first power supplying path between the power terminal and the voltage regulating unit or establishing a second power supplying path between the charger unit and the voltage regulating unit; and
- a control unit, coupled to the power switching unit and the voltage regulating unit, and configured to detect the power consumption of the system load, under a heavy load condition, the control unit controlling the power switching unit to conduct the first power supplying path to supply the first voltage supplying voltage to the voltage regulating unit, unit under a light load condition, the control unit controlling the power switching unit to conduct the second power supplying path to supply the second voltage supplying voltage to the voltage regulating unit, wherein the control unit determines the power consumption of the system load based on an output current outputted from the voltage regulating unit;
- wherein the power consumption of the system load under the heavy load condition is greater than the power consumption of the system load under the light load condition.

11. The power supplying system according to claim 10, wherein the heavy load condition indicates that the power consumption of the system load is greater than an upper power limit; the light load condition indicates that the power consumption of the system load is less than a lower power limit, wherein when the power consumption of the system load lies between the upper power limit and the lower power limit, the switching unit maintains the power source of the voltage regulating unit; wherein the upper power upper limit is greater than the lower power limit.

12. The power supplying system according to claim 10, wherein when the power consumption of the system load gradually increases and enters the heavy load condition, the switching unit supplies the first supplying voltage to the voltage regulating unit; when the power consumption of the system load gradually decreases and enters the light load condition, the switching unit supplies the second supplying voltage to the voltage regulating unit.

13. The power supplying system according to claim 10, wherein the control unit is coupled to the system load and the control unit determines the power consumption of the system load according to a detection signal received from the system load.

14. The power supplying system according to claim 10, wherein the control unit actively detects the power consumption of the system load at a predetermined time, and correspondingly controls the operation of the power switching circuit.

15. The power supplying system according to claim 10, wherein the power switching circuit comprises:
- a first resistor, a first end of the first resistor configured to receive an operating voltage;
- a second resistor, a first end of the second resistor coupled to a second end of the first resistor;
- a first NPN transistor, a collector of the first NPN transistor coupled to a second end of the second resistor, an emitter of the first NPN transistor coupled to a ground, and a base of the first NPN transistor being coupled to the control unit;
- a third resistor coupled between the base of the first NPN transistor and the ground;
- a first PMOS transistor, a drain of the first PMOS transistor coupled to the output terminal of the charger unit, a gate of the first PMOS transistor coupled to the second end of the first resistor, and a source of the first PMOS transistor coupled to the voltage regulating unit;
- a second PMOS transistor, a drain of the second PMOS transistor coupled to the source of the first PMOS transistor, and the voltage regulating unit, a source of the second PMOS transistor coupled to the power terminal and the operating voltage, a gate of the second PMOS transistor coupled to second end of a fourth resistor; and
- a second NPN transistor, a collector of the second NPN transistor coupled to the operating voltage through the fourth resistor, the collector of the second NPN transistor also coupled to the gate of the second PMOS transistor, an emitter of the second NPN transistor coupled to the ground, and a base of the second NPN transistor coupled to the collector of the first NPN transistor.

16. The power supplying system according to claim 10, wherein the power supplying circuit and the system load are disposed on a mainboard.

* * * * *